United States Patent [19]
Hoots et al.

[11] Patent Number: 5,416,323
[45] Date of Patent: * May 16, 1995

[54] LEAK DETECTION AND RESPONSIVE TREATMENT IN INDUSTRIAL WATER PROCESSES

[75] Inventors: John E. Hoots, St. Charles, Ill.; Luciano E. Savorgnan, Gretna; Glenn J. St. Amant, River Ridge, both of La.

[73] Assignee: Nalco Chemical Company, Naperville, Ill.

[*] Notice: The portion of the term of this patent subsequent to Apr. 19, 2011 has been disclaimed.

[21] Appl. No.: 146,705

[22] Filed: Nov. 1, 1993

Related U.S. Application Data

[63] Continuation-in-part of Ser. No. 974,144, Nov. 10, 1992, Pat. No. 5,304,800.

[51] Int. Cl.$^6$ ............................................ G01N 21/90
[52] U.S. Cl. ....................................................... 250/302
[58] Field of Search ........................................ 250/302

[56] References Cited

U.S. PATENT DOCUMENTS

| | | | |
|---|---|---|---|
| 4,783,314 | 11/1988 | Hoots et al. | 422/3 |
| 4,966,711 | 10/1990 | Hoots et al. | 210/697 |
| 4,992,380 | 2/1991 | Moriarty et al. | 436/55 |
| 5,041,386 | 8/1991 | Pierce et al. | 436/50 |
| 5,128,419 | 7/1992 | Fong et al. | 525/351 |
| 5,171,450 | 12/1992 | Hoots et al. | 210/701 |
| 5,272,346 | 12/1993 | Kaplan et al. | 250/373 |
| 5,278,074 | 1/1994 | Rao et al. | 436/52 |
| 5,304,800 | 4/1994 | Hoots et al. | 250/302 |

FOREIGN PATENT DOCUMENTS

| | | |
|---|---|---|
| 0062306 | 10/1982 | European Pat. Off. |
| 2657851 | 6/1978 | Germany |
| 2238383 | 5/1991 | United Kingdom |

OTHER PUBLICATIONS

"Practical Applications of Tracers-Beyond Product Monitoring", J. E. Hoots, Cooling Tower Institute 1990 Annual Meeting, Technical Paper No. TP90-01, 14 pp, presented Feb. 1990.

"Effluent monitoring For Oil in Water", K. Coursin, Pollution Engineering, pp. 100-102 Nov. 1988.

"Use of Fluorescence Spectroscopy for Monitoring Petroleum Hydrocarbon Contamination in Estuarine and Ocean Waters", W. A. Maher, Bull. Environ. Contam. Toxicol. 30, pp. 413-419, 1983.

"Fluorescence Cell Design and Use to Determine Crude Oil in Water", P. John, E. R. McQuat and I. Soutar, Analyst (London), vol. 107, pp. 221-223, Feb., 1982.

"Spectroscopic Techniques for Quality Assurance of Oil Field Corrosion Inhibitors", J. A. Martin and F. W. Valone, National Association of Corrosion Engineers, Aug., 1985, vol. 41, No. 8, pp. 466-473, presented Corrosion/84, Paper No. 223, Apr., 1984, New Orleans, La.

"The Existence of Imidazoline Corrosion Inhibitors", J. A. Martin and F. W. Valone, National Association of Corrosion Engineers, May 1985, vol. 41, No. 5, pp. 281-287 presented Corrosion/84, paper No. 232, Apr., 1984 New Orleans, La.

Literature Search Report No. 4118, Apr. 13, 1992, subject entitled "Use of Natural Fluorescence to Detect Process Leaks Into Water Systems, Expecially Cooling Towers", pp. 1-24.

Literature Search Report No. 3244, Jul. 19, 1990, subject entitled "Continuous On-line Fluorescence Monitoring of Soluble Oils In Water, Wastewater Or Other Aqueous Solutions", pp. 1-26.

Primary Examiner—Constantine Hannaher
Attorney, Agent, or Firm—Robert A. Miller; James J. Drake

[57] ABSTRACT

Leakage is detected between a process fluid and a temper fluid, or from a process fluid to a temperature-conditioning fluid, wherein one but not both of said A and said B fluids is an industrial process fluid and wherein at least one of said A and said B fluids is a gaseous stream, in an industrial process. The industrial process includes an A and a B fluid, and one of the A and B fluids receives heat from or transfer heat to the other of the A and the B fluids by an indirect contact method, and one but not both of the A and the B fluids is an industrial process fluid. In particular, the A fluid is a temperature-conditioning fluid that receives heat from a process fluid, for instance wherein the A fluid is the water of a waste-heat boiler and the B fluid is a gaseous process stream.

20 Claims, 1 Drawing Sheet

Figure

LEAK DETECTION AND RESPONSIVE TREATMENT IN INDUSTRIAL WATER PROCESSES

This application is a continuation-in-part of U.S. patent application Ser. No. 07/974,144, filed on Nov. 10, 1992, now U.S. Pat. No. 5,304,800 John E. Hoots, et al.

TECHNICAL FIELD OF THE INVENTION

The present invention is in the technical field of detection of leaks between temperature-conditioning fluids and process fluids in industrial water processes, optionally together with an appropriate responsive treatment of the contaminated fluid.

BACKGROUND OF THE INVENTION

Many industrial processes are comprised of at least one body of process fluid serviced by at least one body of temperature-conditioning fluid, which is commonly an aqueous-based temperature-conditioning water, such as cooling water, boiler water, pasteurization water and the like. These fluids are held within separate lines or other confines to prevent contamination of one fluid with the other fluid. The servicing of a process fluid (liquid, solid-containing slurry, gas or mixtures thereof) by a temperature-conditioning fluid, however, generally requires such fluids to be brought into close proximity, such as being routed on opposite sides of a heat exchanger wall or surface. The close proximity of such distinct bodies of fluids creates a serious, but unavoidable, risk of leakage between fluids, whereby at least one fluid is contaminated by the other.

The ramifications of such process fluid/temperature-conditioning fluid leakage can be extremely serious because the compositions of such fluids are very dissimilar in most industries.

Temperature-conditioning fluids routinely are waters (most often, but not necessarily in liquid form) that contain far less solutes or other non-$H_2O$ substances than process fluids. The non-$H_2O$ substances of temperature-conditioning waters are typically inorganic materials. Organic substances, whether naturally occurring or added as treatment chemicals, are generally present only in relatively minute amounts. In contrast, not only does the concentration of non-$H_2O$ substances in process fluids typically dwarf that of temperature-conditioning fluids, but process fluids may be comprised in significant portion of organic materials or substantially wholly of non-$H_2O$ inorganic substances.

Leakage from a process fluid to a temperature-conditioning fluid not only represents a process fluid loss, but also can significantly increase the overall manufacturing costs and can lead to serious fouling of the temperature-conditioning fluid system. Leakage from a temperature-conditioning fluid to a process fluid not only represents a temperature-conditioning fluid loss, which can throw off a temperature-conditioning fluid treatment program, but also can seriously taint the process fluids. These dissimilar fluids are not intended to contact each other or intermix in any manner, and when the mingling of some portion of one with the other occurs through leakage, a method whereby such leakage is not only detected, but also located and/or quantified, would be highly advantageous to the manufacturing process.

It is an object of the present invention to provide a method for detecting leakage between at least one body of temperature-conditioning fluid and at least one body of process fluid in an industrial process. It is an object of the present invention to provide a method for locating the site of leakage between at least one body of temperature-conditioning fluid and at least one body of process fluid in an industrial process. It is an object of the present invention to provide a method for quantifying leakage between at least one body of temperature-conditioning fluid and at least one body of process fluid in an industrial process. It is an object of the present invention to provide a method for responsive treatment of a body of temperature-conditioning fluid and/or a body of process fluid upon the detection, location and/or quantification of leakage there between in an industrial process. These and other objects of the present invention are discussed in detail below.

DISCLOSURE OF THE INVENTION

Figure 1:
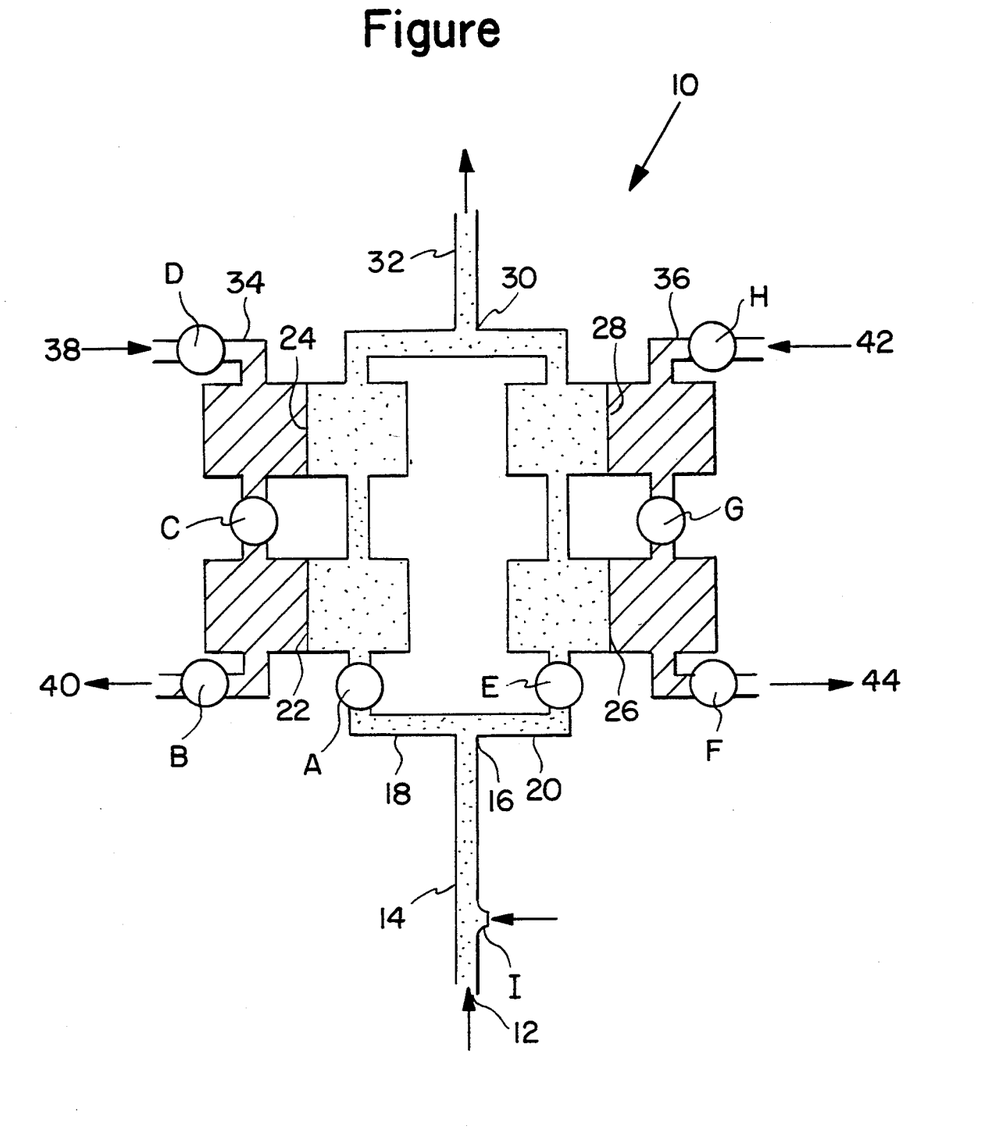
FIG. 1 is a diagrammatical depiction of a bank of four heat exchangers and sampling points for the purpose of the process of the present invention.

The present invention provides a method for detecting leakage between an industrial process fluid and a temperature-conditioning fluid, particularly when one of said fluids is gaseous, comprising subjecting at least a sample of at least one of such fluids to analysis to detect the presence and/or the concentration of a signature compound therein, and at times the concentration change and/or concentration gradient of the signature compound in at least one of such fluids. In preferred embodiments at least one of such fluids is an aqueous-based fluid and the analysis is a fluorescence analysis or a combination of high pressure liquid chromatography and fluorescence analysis. These and other preferred embodiments are described in detail below.

Preferred Embodiments of the Invention

Temperature-conditioning fluids are used for process fluid temperature-conditioning in many industries. Process fluids of major industrial water processes that may be cooled or heated by indirect contact with temperature-conditioning fluid include without limitation the process fluids of the chemical industry, the steel industry, the food processing industry and the like. By process fluid is meant generally herein a body of fluid, which commonly but not necessarily, is a stream, that contains a raw material, an intermediate or a product of a manufacturing process. The process of the present invention in broad embodiment is not dependent on the specific type of process fluid.

Temperature-conditioning fluids include without limitation cooling waters (such as once-through cooling waters and recirculating cooling waters), boiler waters (such as waste-heat boiler waters), other indirect-contact cooling or heating waters, such as pasteurization waters, and the like, wherein the fluids are in sufficiently close proximity to constitute a leakage risk therebetween. The primary function of temperature-conditioning fluids is that of a heat source or heat receiver, and therefore there seldom would be arty practical reason for employing a fluid other than water (as a liquid or steam), but the use of some other fluid as the temperature-conditioning fluid does not exclude the applicability of the process of the present invention for that reason alone. The process of the present invention in broad embodiment is not dependent on the specific type of temperature-conditioning fluid.

Temperature-conditioning fluids and process fluids are generally brought into indirect contact for the purpose of heat transfer from the source fluid (which normally is the process fluid in cooling water and waste-heat boiler systems) to the receiver (which is the cooling water in cooling water and waste-heat boiler systems), during which heat transfer process the fluids are separated by a barrier(s) that is a good conductor of heat. Such a barrier is called the heat transfer surface. An assembly comprised of at least one heat transfer barrier, which barrier has a process fluid side and a temperature-conditioning fluid side, in a containment vessel, is called a heat-exchanger. A simple heat-exchanger may be comprised of a tube or pipe located concentrically inside of another (the shell). In such a shell-and-tube heat-exchanger the process fluid typically flows through the inner pipe, and the temperature-conditioning fluid flows through the annulus between the inner pipe and the shell. In a parallel or concurrent flow heat-exchanger, both fluid streams flow in the same direction. In a countercurrent flow heat-exchanger, the fluid streams flow in opposite directions. Regardless of the type or complexity of a heat-exchanger, a characteristic common to all is transfer of heat across heat transfer surface that has a process fluid side and an opposite temperature-conditioning fluid side.

In a food processing process, the process fluid may be contained in one or a plurality of enclosed containers, such as jars or bottles, which are immersed in an elevated temperature-conditioning fluid, such as cooking or pasteurization waters, and the heat is transferred from the temperature-conditioning fluid across the wall(s) of the containers. Such an assembly can, and herein is, also considered a heat-exchanger.

Leakage between a temperature-conditioning fluid and a process fluid most commonly occurs within a heat-exchanger because within a heat-exchanger there is generally only a single heat exchange surface or wall separating the fluid bodies. Moreover, there generally is a temperature gradient across such surface or wall and a significant stream flow along at least one side of such surface or wall, which conditions create material stresses that can lead to ruptures. Leakage between a temperature-conditioning fluid and a process fluid can of course also occur elsewhere, such as when such fluids are held in, or flow through, vessels or lines or the like that have contiguous walls, or when a normally-closed flow path between such vessels or lines or the like is in some way breached. The process of the present invention in broad embodiment is not dependent on the specific type of leakage site, and instead is applicable to any manufacturing industry process having a process fluid and a temperature-conditioning fluid that are normally, or desirably, kept isolated from each other to avoid any cross-contamination, although such fluids would normally be brought into close proximity (indirect contact) for heat exchange purposes.

Regardless of how leakage occurs, the dissimilarity between such fluids generally is a controlling factor as to the gravity of the problem(s) created by cross-contamination. For instance, pasteurization water is routinely free of organic nutrients, and thus is not normally treated with biocide to control microbial growth. If a product container ruptures during the pasteurization process, however, the product fluid released into such waters could well contain sufficient nutrients to trigger microbial growth and seriously foul such water.

In many industries employing cooling water systems, the process streams contain significant amounts of hydrocarbons which would lead to cooling water fouling if leaked to the cooling water stream or basin. In many industries employing cooling water systems, cooling waters are treated with corrosion inhibitors, scale inhibitors, possibly biocides, and other agents, and while such agents are generally present in cooling waters in only minute amounts, even extremely minute amounts thereof may be sufficient to seriously taint the material in the process waters.

Cross-contamination between temperature-conditioning fluids and process fluid can lead to such grave problems that the choice of temperature-conditioning fluid treatment agents may be limited to those agents having less potential for harm but less than optimum treatment effectiveness. The process of the present invention may open such limitations, permitting the use of more effective agents in some instances.

A boiler is a vessel in which water is vaporized into steam by the application of heat, typically on a continuous basis. The steam generated is most often used either as a direct or indirect heat transfer medium and/or to generate electric power. Many technologies have been and are currently being developed for detecting boiler water leaks at the earliest possible moment. These technologies include the use of steam drum level control, computer algorithm, and others. Among the recently developed technologies for early leak detection is the use of sodium ion concentration to detect tube leaks (balancing the sodium ion mass between the boiler feedwater and blowdown), but the sensitivity of the sodium-specific electrode is affected by pH among other feedwater variables. Some boiler operators are currently using complex computer systems in attempts to use boiler operating data for leakage detection with intricate calculations. A leak detection method of greater efficiency and/or sensitivity is needed, because the early detection of leaks requires detection of an extremely small water loss from a large dynamic water system. A leak detection method of great sensitivity must be independent of chemical species that might be present in boiler feedwater in amounts varying with the operation efficiency of the demineralizer, mixed bed polisher or other techniques used to purify the feedwater prior to introduction into the boiler.

As noted above, a very simple heat-exchanger may be comprised of concentric tubing, but in most industrial plants a heat-exchange system is comprised of more complex heat-exchangers and/or a plurality of heat-exchangers. The walls of the multitude of lines and/or vessels cannot conveniently be examined on a routine basis for ruptures or other breaches. Such an examination would require disruption of the process and often an extensive disassembly of the system. Leakage detection between temperature-conditioning fluids and process fluids, determining the site(s) of leakage, and/or quantifying the degree of leakage through the process of the present invention will minimize the cross-contamination potential and minimize the process disruption and/or system disassembly required to alleviate the cross-contamination potential.

In addition, in an embodiment of the present invention the process includes a responsive activation of an appropriate treatment of the contaminated fluid upon the detection and/or quantification of leakage thereinto. For instance, if the leakage is a container rapture that releases nutrients into a temperature-conditioning water, such as a pasteurization water, the process of the present invention in an embodiment is the detection of such leakage which in turn activates a feed of biocide into the contaminated water. As another example, the leakage of concern in a system may be the contamination of cooling water with hydrocarbons, and the present invention provides the detection of hydrocarbons in the cooling water stream which in turn activates a feed of an oil dispersant to the cooling water system. In another embodiment, for such example, the leakage may be, or also be, quantified and the level of dispersant feed determined by such quantification.

Thus in a preferred embodiment of the invention, the detection and/or quantification of a leakage that releases a contaminant to one of the fluids also activates a feed of at least one treatment agent, effective to decrease the deleterious effect of such contamination, to the contaminated fluid. In further preferred embodiment, such responsive activation of treatment agents also dictates that an amount of such treatment agent effective to decrease the deleterious effect of such contamination is fed to the contaminated fluid. The process of the present invention in broad embodiment is not dependent on the specific type of treatment agent, except to the extent that it be effective to decrease or lessen the harmful effect(s) of the contamination caused by leakage from one fluid to the other.

Temperature-conditioning fluids, while containing generally a far lower concentration of components than process fluids, nonetheless can vary widely as to their makeup. The source of the fluid, the treatment programs employed and the concentration ratio of the fluid in the system are major factors determining the type of components and the concentration thereof. Among the solutes that are present in cooling water as taken from its source are calcium ions, magnesium ions, sulfate ions, silicate ions and suspended substantially inorganic solids. Among the solutes that may be introduced into cooling water in water-treatment programs are zinc, molybdates, silicates, polyphosphates, polyol esters, phosphonates, natural organics, synthetic organic polymers, nonoxidizing biocides, halogen-based biocides and ozone. Cooling waters prior to process fluid contamination generally can be characterized as having a pH of from about 6.5 to about 9.5, having a concentration of solutes of up to about 10,000 ppm, and having a concentration of suspended, or colloidal, solids of not more than up to about 200 ppm.

Boiler water also contains some amount of solutes and/or suspended or colloidal solids. Limiting the concentration of such impurities is an operating parameter that is either well monitored, or should be well monitored. Limits on boiler cycles of concentration, so as to limit the maximum impurity concentration within a boiler, are routinely set by boiler and turbine manufacturers, water treatment companies and the industrial plants employing the boilers. Such limitations are intended for, and are generally necessary to, the avoidance of serious scale formation/deposition despite an otherwise adequate water treatment program. Boiler feedwater, which normally is comprised of both makeup water and recirculated condensate water, contains some impurities regardless of the extent to which such waters are treated before being fed to a boiler. When steam is generated, substantially pure $H_2O$ vapor is discharged from the boiler, leaving the impurities (the dissolved and suspended solids) behind, which increases their concentration in the boiler water. The discharged steam is replaced by contaminant-containing feedwater. An ever increasing concentration of dissolved and suspended solids in the boiler water would inevitably result in very serious problems, including deposit formation, corrosion, foaming and carryover, decreased heat transfer efficiency, boiler tube failure or occlusion, and the like. Boiler-impurities concentration (boiler solids concentration) is offset by withdrawing water as normal blowdown. The heat energy in the normal blowdown, however, is a major factor reducing a boiler's thermal efficiency, and therefore a blowdown rate in excess of that required to limit solids concentration is preferably avoided. An excessive blowdown rate also unnecessarily increases water costs.

Process fluids are even less susceptible to makeup generalizations than cooling or boiler waters. Process fluids generally have a widely varying concentrations of non-$H_2O$ material, including nonaqueous liquids, solids, gases, solutes, and the like. Some process fluids contain a significant concentration of organics, and a major concern may be contamination of the temperature-conditioning fluid with such organics. In other industrial processes the process fluids may instead contain significant concentrations of inorganic material which is a major concern as to temperature-conditioning fluid contamination. In other instances the process fluid normally contains little to no water, and the major concern is the contamination of such process fluid with water from the temperature-conditioning fluid. The process of the present invention is not limited as to the nature of the potential contaminant, nor as to whether the primary concern is contamination of the temperature-conditioning fluid by process fluid, or vice versa, or even both.

The signature compound(s) may be a normal component of one of the fluids, for instance one or more aromatic hydrocarbons of a hydrocarbon-containing process fluid, or it may be a tagged version of a normal component of one of the fluids, for instance a polymeric cooling water treatment agent tagged with fluorescent group(s), or it may be a compound(s) added to one of the fluids for the primary purpose of being a signature compound for the present process. In the latter two instances, the signature compound is often referred to as a "tracer" or "specie of chemical tracer", and the functional "tracer" terminology is also applicable to normal fluid components that act as tracers for the purposes of the present invention. The tracer is preferably selected from among those that are easily detectable by the analysis method being employed in the process. Such analysis methods include fluorescence analysis and HPLC and fluorescence analysis combinations, and at times ion-electrode analysis, colorimetry analysis, transition metal analysis, combinations of HPLC and other detection methods such as light absorbance analysis, post-column derivatization, conductivity and the like, some of which are described in more detail below.

Fluorescence Emission Spectroscopy

The detection and quantification of specific substances by fluorescence emission spectroscopy is founded upon the proportionality between the amount of emitted light and the amount of a fluoresced substance present. When energy in the form of light, including ultra violet and visible light, is directed into a sample cell, fluorescent substances therein will absorb the energy and then emit that energy as light having a longer wavelength than the absorbed light. The amount of emitted light is determined by a photodetector. In practice, the light is directed into the sample cell through an optical light filter so that the light transmitted is of a known wavelength, which is referred to as the excitation wavelength and generally reported in nanometers ("nm"). The emitted light is similarly screened through a filter so that the amount of emitted light is measured at a known wavelength or a spectrum of wavelengths, which is referred to as the emission wavelength and generally also reported in nanometers. When the measurement of specific substances or categories of substances at low concentrations is desired or required, such as often is the case for the process of the present invention, the filters are set for a specific combination of excitation and emission wavelengths, which wavelengths are selected for substantially optimum low-level measurements.

A Gilford Fluoro IV dual-monochromator spectrofluorometer can be used for a fluorometric analysis conducted on an intermittent basis and for on-line fluorescence monitoring, a portable fluorometer equipped with appropriate excitation and emission filters and a quartz flow through cell can be used, such as is commercially available from Turner Designs (Sunnyvale, Calif.) Model Fluorometer 10 AU. This fluorometer can be equipped with a 0.3-centimeter diameter and 2-inch long flowcell which allows for a large fluorescence intensity, the fluorescence intensity from a given source being proportional to cell path.

In general, the concentration of an tracer can be determined from a comparison of a sample's emissions intensity to a calibration curve of the given tracer's concentration versus emissions, for the same set of excitation wavelength/emission wavelengths. Such a concentration-by-comparison method by which the sensed emissions are convened to a concentration equivalent preferably is employed to determine concentrations of an tracer that are within the concentration range over which a linear emission response is observed, and this concentration range is referred to herein as the "linear-emission-response concentration range". The linear-emission-response concentration range is to some extent dependent upon the specific tracer and the excitation wavelength/emission wavelength set employed. At tracer concentrations higher than a given tracer's linear-emission-response concentration range, there is a negative deviation from ideal (linear) behavior, the degree of emission for a given concentration being less than predicted by a linear extrapolation. In such instances, the sample can be diluted by known factors until the concentration of the tracer therein falls within the linear-emission-response concentration range. If the tracer is present in the sample at only very low concentrations, there are techniques for concentrating the tracer by known factors until its concentration falls within the linear-emission-response concentration range or is otherwise more readily measured, for instance by liquid-liquid extraction. Nonetheless, preferably a calibration curve over the linear-emission-response concentration range would be prepared or obtained before employing a given tracer, and preferably the tracer would be added to the feedwater of one of the fluids in an amount sufficient to provide a concentration of the tracer in the fluid being analyzed that is within the linear-emission-response concentration range. Generally the linear-emission-response concentration range of an tracer is sufficiently broad to readily estimate the amount of the tracer that will be sufficient for this purpose. A linear-emission-response concentration range will most often extend through a concentration range from a concentration of "m" to a concentration of at least 10 m.

At times it may be desired to employ a plurality of tracers. For instance, it may be desired to use a plurality of tracers to confirm that none is undergoing any tracer-specific loss or to use one tracer to detect a given variance and another for the detection of a different variance or other parameter. Such separate and distinct tracers can each be detected and quantified in a single water sample despite both being fluorescent tracers if their respective wavelengths of emission do not interfere with one another. Thus concurrent analyses for multiple tracers is possible by selection of tracers having appropriate spectral characteristics. Preferably widely separated wavelengths of radiation should be used to excite each of the tracers and their fluorescent emissions should be observed and measured at widely separated emission wavelengths. A separate concentration calibration curve may be prepared or obtained for each tracer. In other words, more than one tracer can be employed, and then the presence and/or concentration of each such tracer in the sample should be determined using analytical parameters (particularly the excitation/emission wavelengths) effective for each such tracer, which analytical parameters preferably are sufficiently distinct to differentiate between measurements.

Fluorescence emission spectroscopy is one of the preferred analysis techniques for the process of the present invention. Certain compounds that normally occur in either the temperature-conditioning fluid or the process fluid are inherently tracers for a fluorescence analysis. For example, aromatic hydrocarbons are components of some process fluids, including hydrocarbon-containing process streams and process fluids held in discrete containers. Foodstuffs may contain one or more components that readily fluoresce, such as beer which has been found to test positive for fluorescence analysis and thus leakage by bottle breakage during pasteurization can be readily detected and quantified by fluorescence monitoring of the pasteurization waters, and can activate a responsive feed of biological control agents or the like to such waters to lessen the harmful effects of contamination by a nutrient-containing substance. Some naturally fluorescent compounds are also water treatment agents, and thus may be among the normal components of cooling waters, such as aromatic organic corrosion inhibitors, such as aromatic(thio)(tri)azoles. Some water treatment agents may be susceptible to tagging with fluorescent groups, for instance as disclosed in U.S. Pat. No. 5,128,419, D. W. Fong and J. E. Hoots, issued Jul. 7, 1992, incorporated herein by reference, wherein the tagging of polymers with pendant fluorescent groups by (trans)amidation derivatization of pre-existing polymers having carbonyl-type pendant groups is disclosed. Water-treatment polymers tagged with pendant fluorescent groups may of course be prepared by methods other than (trans)amidation derivatization. Other fluorescent chemical tracers and monitoring techniques are now known, for instance as disclosed in U.S. Pat. No. 4,783,314, J. E. Hoots and B. E. Hunt, issued Nov. 8, 1988, incorporated herein by reference, wherein inert fluorescent tracers are employed in combination with a fluorescence monitoring, such as the sodium salt of 2-naphthalenesulfonic acid and Acid Yellow dye.

In general for most fluorescence emission spectroscopy methods having a reasonable degree of practicality, it is preferable to perform the analysis without isolating in any manner the fluorescent tracer. Thus there may be some degree of background fluorescence in the sample on which the analysis is conducted, which background fluorescence may come from compounds within the sample that are unrelated to the present invention. In instances where the background fluorescence is low, the relative intensities (measured against a standard fluorescent compound at a standard concentration and assigned a relative intensity for instance 100) of the fluorescence of the tracer versus the background can be very high, for instance a ratio of 100/10 or 500/10 when certain combinations of excitation and emission wavelengths are employed even at low fluorescent tracer concentrations, and such ratios would be representative of a "relative fluorescence" (under like conditions) of respectively 10 and 50. In preferred embodiment the excitation/emission wavelengths and/or the amount of tracer employed are selected to provide a relative fluorescence of at least about 5 or 10 for the given background fluorescence anticipated.

For instance, for most cooling water backgrounds and most boiler water backgrounds, a compound that has a relative fluorescence of at least about 5 at a reasonable concentration is very suitable as a fluorescent tracer itself or as a tagging agent for water treatment polymers and the like when such compounds contain an appropriate reactive group for the tagging reaction. When there is or may be a specific chemical specie of reasonably high fluorescence in the background, the tracer and the excitation and/or emission wavelengths often can be selected to nullify or at least minimize any interference of the tracer measurement(s) caused by the presence of such specie.

A determination of the presence of a fluorescent tracer and optionally the concentration thereof in the blowdown from a boiler system can be made when the concentration of the tracer in the boiler water is only several parts per million (ppm) or even parts per billion (ppb) for some of the tracer that can be employed in the process of the present invention. In preferred embodiment, the amount of a fluorescent tracer added to a process fluid should be sufficient to provide a concentration of the tracer in the boiler water blowdown to be analyzed of from about 5 ppb to about 100 or 200 ppm if leakage therebetween occurs, although the preferred tracers specifically mentioned herein need not be present in the sample analyzed in excess of about 5 or 7 ppm. In another preferred embodiment, the amount of a fluorescent tracer added to a boiler water should be sufficient to provide a concentration of the tracer in the process fluid sample to be analyzed of from about 5 ppb to about 100 or 200 ppm if leakage therebetween occurs. Such analyses, that is, the measurements of the light emitted in response to the light transmitted to the blowdown or process fluid sample, can generally be made on-site, preferably on an almost instant and continuous or intermittent basis, with simple portable equipment, such as the photodetector and screens described above.

When the tracer is 2-NSA, one of the water-soluble salts of naphthalene sulfonic acid ("NSA"), its concentration in a sample from a process fluid or a temperature-conditioning fluid can be fluorometrically measured by excitation at 227 nm and emission measurement at 334 nm, and the emissions observed referenced to a standard aqueous solution containing 0.5 ppm 2-NSA, as acid actives.

One method for the continuous on-stream monitoring of chemical tracers by fluorescence emission spectroscopy and other analysis methods is described in U.S. Pat. No. 4,992,380, B. E. Moriarity, J. J. Hickey, W. H. Hoy, J. E. Hoots and D. A. Johnson, issued Feb. 12, 1991, incorporated hereinto by reference.

Combined HPLC-Fluorescence Analysis.

The combination of high-pressure liquid chromatography ("HPLC") and fluorescence analyses of fluorescent tracers is a powerful tool for the present leak detection process, particularly when very low levels of the fluorescent tracer are used or the background fluorescence encountered would otherwise interfere with the efficacy of the fluorescence analysis. The HPLC-fluorescence analysis method allows the tracer compound to be separated from the fluid matrix and then the tracer concentration can be measure. The combination of HPLC-fluorescence analysis is particularly effective for measuring minute levels of tracer in highly contaminated fluids.

The HPLC method can also be effectively employed to separate a tracer compound from a fluid matrix for the purposes of then employing a tracer-detection method other the fluorescence analysis, and such other tracer-detection methods include without limitation light absorbance, post-column derivatization, conductivity and the like, which methods are described in "Techniques in Liquid Chromatography", C. F. Simpson ed., John Wiley & Sons, New York, pp. 121–122, 1982, incorporated hereinto by reference, and "Standard Method For The Examination Of Water And Wastewater", 17th Edition, American Public Health Association, pp. 6–9 to 6–10, 1989, incorporated hereinto by reference.

Colorimetry Analysis

Colorimetry or spectrophotometry may be employed to detect and/or quantify a chemical tracer. Colorimetry is a determination of a chemical specie from its ability to absorb ultraviolet or visible light. One colorimetric analysis technique is a visual comparison of a blank or standard solution (containing a known concentration of the tracer specie) with that of a sample of the fluid being monitored. Another colorimetric method is the spectrophotometric method wherein the ratio of the intensities of the incident and the transmitted beams of light are measured at a specified wavelength by means of a detector such as a photocell or photomultiplier tube. Using a colorimetric probe, a fiber optic (dual) probe, such as a Brinkman PC-80 probe (570 nm filter), a sample solution is admitted to a flowcell in which the probe is immersed. One fiber optic cable shines incident light through the sample liquid onto a mirror inside the cell and reflected light is transmitted back through the sample liquid into a fiber optic cable and then to the colorimetric analyzer unit, which contains a colorimeter, by the other cable. The colorimeter has a transducer that develops an electrical analog signal of the reflected light characteristic of the tracer concentration. The voltage emitted by the transducer activates a dial indicator and a continuous line recorder printout unit. A set point voltage monitor may be employed to constantly sense or monitor the voltage analog generated by the colorimeter, and upon detection of a tracer signal (discussed below), a responsive signal may be transmitted to a responsive treatment agent feed line to commence or alter the rate of feed. Such a colorimetric analysis technique and the equipment that may be employed therefor are described in U.S. Pat. No. 4,992,380, B. E. Moriarity, J. J. Hickey, W. H. Hoy, J. E. Hoots and D. A. Johnson, issued Feb. 12, 1991, incorporated hereinto by reference. Chemical tracers suitable for use in conjunction with a colorimetric technique include transition metals (discussed below) and substances which show light absorbance which is detectable from that of other species present in the system fluid or substances which react with color-forming reagents to produce light absorbance which is detectable from that of other species present in the system fluid.

Ion Selective Electrode Analysis

An ion selective electrode may be used to determine the concentration of an inert chemical tracer through the direct potentiometric measurement of specific ionic tracers in aqueous systems. These electrodes respond only to selected ionic materials and gases dissolved in liquids, and hence such tracers must be ionized (or dissolved gases) in the environment in which they are to be determined. Ion selective electrodes work like pH electrodes, depending on a potential developed across a thin membrane by the difference in the concentrations of the ion (or gas) to be measured on each side of the ionically conducting thin layer. The concentration within the electrode is fixed and the potential varies with the concentration of ions (or gas) in the same. By calibration (the potential or current versus the concentration), the ionic (or gas) concentration at the sample electrode can be indexed to a reference or standard electrode that is insensitive to the tracer ion. To provide continuous monitoring of the tracer, the electrodes may be dipped directly into a stream of one of the fluids (collectively comprising a flow cell), or the fluid being monitored may be passed through an external flow cell into which the ion-selective and reference electrodes have been inserted. An ion selective electrode tracer monitoring technique and the equipment therefor are described in U.S. Pat. No. 4,992,380, B. E. Moriarity, J. J. Hickey, W. H. Hoy, J. E. Hoots and D. A. Johnson, issued Feb. 12, 1991, incorporated hereinto by reference. As noted above, methods such as ion selective electrode analysis are not suitable for many types of boilers because the high purity of there feedwaters. When the concentration of feedwater solutes is extremely low, very small variations in purification processes lead to relatively high percentage variations of the solutes in the feedwaters as fed to boilers.

Transition Metal Analysis

A transition metal compound (transition metal ions, oxy-anions, cations and associated complexes) can be quantitatively measured by one or more of known techniques. A preferred technique is the colorimetry analysis discussed above. Another technique is molecular absorption. Molecular absorption in the ultra violet and visible region depends on the electronic structure of the molecule. The energy absorbed elevates electrons from orbitals in a lower-energy state to orbitals in a higher-energy state. A given molecule can absorb only certain frequencies because only certain states are possible in any molecule and the energy difference between any ground and excited state must be equal to the energy added. At a frequency that is absorbed by a molecule, the intensity of the incident energy is greater than the intensity of the emergent energy, and is a measure of the absorbance. A sample of the fluid being monitored may be compared to a calibration curve (absorbance versus concentration) prepared from standard solutions containing known concentrations of the transition metal (or other suitable tracer specie) to detect and determine the concentration of the tracer. A molecular absorption technique for transition metal tracers is described in U.S. Pat. No. 4,992,380, B. E. Moriarity, J. J. Hickey, W. H. Hoy, J. E. Hoots and D. A. Johnson, issued Feb. 12, 1991, incorporated hereinto by reference.

Analytical techniques for detecting the presence and/or concentration of a chemical specie without isolation thereof are within an evolving technology, and the above survey of reasonable analytical techniques for use in the process of the present invention may presently not even be exhaustive, and most likely techniques equivalent to the above for the purposes of the present invention will be developed in the future.

A specie of chemical tracer may be selected for a given process based on a preference for one or more analytical techniques, or an analytical technique may be selected for a given process based on a preference for one or more chemical tracers. In preferred embodiment, the chemical compound(s) selected as the tracer should be soluble in at least one, and more preferably in both, of the temperature-conditioning fluid and process fluid of the industrial process, at least at the concentration level(s) expected in the respective fluid. For instance, a tracer may be fed to a temperature-conditioning fluid and its presence monitored in the process fluid, where its appearance would result only from leakage. The expected concentration in the process fluid upon such leakage occurring would of course be much less than the concentration of such tracer fed to, or maintained, in the temperature-conditioning fluid. If however only the decrease of tracer concentration in the fluid to which it is fed is to be monitored, its solubility in the other fluid is generally irrelevant. In preferred embodiment, the chemical compound(s) selected as a tracer should be either stable in the environment of at least one of the fluids, and preferably both of the fluids, for the useful life expected of the tracer, or its loss from the fluid due to degradation, deposition, complexation, or other phenomena should be predictable and compensative, particularly when it is desired not merely to detect the presence of some amount of the tracer, but also to determine the concentration thereof, or change in concentration. Nonetheless, the tracer need be stable to the extent it remains detectable upon leakage, particularly when the tracer is added to one of the fluids and analyzed in the other.

In preferred embodiment, the combination of the chemical compound(s) selected as the tracer and the analytical technique selected for determining the presence and/or concentration of such tracer, should permit such determination(s) without isolation of the tracer, and more preferably should permit such determination(s) on a intermittent, continuous and/or on-line basis. In preferred embodiment, the analytical technique(s) Selected for determining the presence and/or concentration of a tracer, should permit such determination(s) to provide a signal that can activate or regulate the feed of an appropriate treatment chemical(s) to the fluid being contaminated by virtue of the leak detected by the technique.

One embodiment the process of the present invention is comprised of adding a chemical tracer to one, but preferably not both, of the temperature-conditioning fluid and the process fluid, and monitoring the concentration of such tracer in the fluid to which it was added by an analytical technique effective for such tracer. In preferred embodiment when the same fluid both receives the tracer feed and is subjected to the monitoring, the monitoring is conducted to determine any decrease in the concentration of the tracer in the receiving fluid across at least one potential leakage site, such as a heat-exchanger. In another and preferred embodiment the process of the present invention is comprised of adding a chemical tracer to one, but preferably not both, of the temperature-conditioning fluid and the process fluid, and monitoring the concentration of such tracer in the other fluid by an analytical technique effective for such tracer, and in preferred embodiment when the one fluid receives the tracer feed while the other is subjected to the monitoring, the monitoring is conducted to determine at least any appearance, and more preferably the concentration, of the tracer in the monitored fluid across at least one potential leakage site, such as a heat-exchanger. In further preferred embodiments, when the industrial process system has more than one potential leakage site, such as a heat-exchanger, the aforesaid monitorings are conducted across more than one of such potential leakage sites, and more preferably substantially across each of such potential leakage sites or heat-exchangers. By monitoring across separate heat-exchangers in bank of heat-exchangers, the location(s) of the leakage among such heat-exchangers can be determined, and the extent of leakage (rate of leakage), at separate leakage sites, may also be determined.

EXAMPLE 1

An industrial ammonia production plant had a waste-heat boiler system in heat exchange relationship with synthesis gas streams. The system included three boilers, three different sources of heat exchange and a common steam drum which separated the steam generated by all the boilers from water. In this waste-heat boiler system the steam-generating heat was being derived from the synthesis gas stream(s). The temperature on the process side (synthesis gas stream side) of this heat-exchange system was about 1700° F. While the synthesis gas stream normally contained some amount of water vapor, contamination of this synthesis stream, and thus the raw material being produced, with boiler water was extremely undesirable for the ammonia production process. Leakage of boiler water into the synthesis gas stream was suspected. A sulfonated aromatic tracer (a fluorescent tracer) was fed to the boilers in their feedwater in known proportion to the feed water. The amount of the fluorescent tracer fed provided a concentration of the tracer therein within the normal range for a boiler, that is, no more than about 5 to 7 ppm. Leakage between at least one of the boilers and the synthesis gas process stream was detected by taking grab samples from the synthesis gas stream, condensing the samples and monitoring the condensate for the presence of the fluorescent inert tracer by fluorescence analysis. The synthesis gas stream contained a sufficient amount of water vapor to provide aqueous condensate samples. While the synthesis gas stream was not a fluid flow normally subjected to monitoring, it was nonetheless found possible both to obtain samples of condensate therefrom and analyze such samples on-site for the presence of the fluorescent tracer. The monitoring of the synthesis gas stream was thus conducted on an intermittent basis and nonetheless was shown to be a very effective method for detecting leakage between the boiler and the process stream. The extremely high temperature of the process stream could well be presumed such an extreme condition that the tracer would wholly degrade before it was detected, but instead it was demonstrated that a sufficient amount of tracer survived in the process stream to be detectable in the condensate samples therefrom and indicate without question that leakage was occurring. It was also found that leakage between a given boiler and the synthesis gas process stream was detectable by monitoring the concentration of the inert tracer in the boiler blowdown. This method detected the dilution of tracer due to leakage. The boiler water lost through the boiler to the synthesis gas stream by leakage had a higher concentration of tracer than the feedwater that replaced it, and thus the tracer concentration in the normal boiler blowdown was less than anticipated given the normal blowdown rate and cycles of concentration set for the boiler.

In certain embodiments of the invention, the process includes the preliminary steps of sampling the temperature-conditioning and/or the process fluid, preferably at all intended sampling sites before the addition of a tracer, to determine baseline conditions. Such preliminary baseline condition(s) determination(s) may also be employed to narrow the selection choice of tracer chemicals or determine and/or modify the selection of sampling points.

In certain preferred embodiments, the sampling points are at the inlet and outlet of at least one heat-exchanger line, and may be along either or both of the temperature-conditioning and process stream sides of such heat-exchanger. If the suspected leakage or the leakage of greatest concern is from the "A" fluid to the "B" fluid (the A fluid being one of the temperature-conditioning fluid or process fluid, and the B fluid being the other), it is feasible to monitor only the A fluid by the "tracer concentration decrease" version of the present invention that is noted above. It would be preferable to instead monitor the B fluid to detect the appearance of the tracer chemical because such monitoring on the side receiving the contamination often would be more sensitive to both the detection and quantification of the leak. Monitoring the B fluid in a given industrial installation may not, however, be the most practical approach. For instance, the B fluid lines may be less accessible to monitoring than the A fluid lines. The B fluid may provide a less desirable environment for monitoring, or be susceptible to monitoring only by a less desirable method. Thus while the monitoring of the fluid being contaminated, or in greater jeopardy of being contaminated, is a preferred embodiment, circumstances nonetheless can render that approach less desirable for practical reasons.

By sampling the fluid being monitored at least the outlet, and preferably at both the inlet and outlet, across at least one potential leakage site, and preferably all potential leakage sites, such as at least one heat-exchanger and preferably all heat-exchangers in an industrial system, one can narrow the potential leakage locations. For instance, if the B fluid (the contaminated or potentially contaminated fluid) is being monitored at the inlets and outlets of each of a plurality of heat-exchangers arranged in series with a countercurrent flow system, the first outlet appearance of the tracer chemical pinpoints the first heat-exchanger that contains a leak along the direction of the B fluid flowpath, and if the monitoring also includes a determination of the concentration of such tracer and/or the rate of change of such concentration, the magnitude of the leakage at that heat-exchanger site can be calculated using other operating parameters such a flow rates of the respective fluids. An increase in the concentration of the tracer in the B fluid downstream of the first leakage site will pinpoint an addition leakage site, and a determination that the tracer concentration in the B fluid has not increased across a downstream heat-exchanger will remove such heat-exchanger from the suspect category. Further for a countercurrent stream flow system, if the A stream is also monitored the first indication of leakage from the A fluid will occur across its most upstream leaking heat-exchanger, which is the most downstream leaking heat-exchanger for the B stream. Thus if the sensitivity of either monitoring in any way lessens downstream when there are plural leakage sites, in countercurrent flow systems the lessening of monitoring sensitivity in one flow stream is offset by the increasing sensitivity in the other flow stream when both fluids are monitored.

Generally it is desirable to employ the least amount of tracer chemical that is practical for the circumstance, and the amount of the tracer added to the fluid should be at least an amount effective for the analysis desired. Seldom would a tracer be deliberately fed to a fluid in an amount grossly in excess of the minimum effective amount because there generally would be no practical purpose in doing so that would justify the costs involved and any deleterious effects on the quality of either of the fluids caused by the presence of the tracer chemical therein. The amount of tracer chemical to be added to the tracer-receiving fluid that is effective without being grossly excessive will vary with a wide variety of factors, including without limitation the tracer and monitoring method selected, the potential for background interference with the selected monitoring method, the magnitude of the suspected or potential leakage, the monitoring mode (on-line continuous, semi-continuous, slug-and-sample, and the like).

Preferably the dosage of tracer added to one of the fluids will be at least sufficient to provide a concentration of tracer in the fluid to which it is added of about 0.1 ppm, up to about 10 or 100 ppm or higher. When the tracer is to be added to an A fluid and monitored in a B fluid, the dosage of tracer added to the A fluid will be m least sufficient to provide a concentration of tracer in the B fluid of at least about 0.01 ppm if leakage of normal magnitude occurs between the fluids, and generally no more than about 10 or at times 100 ppm of the tracer in the B fluid upon leakage would be needed for detection of the leakage.

In one embodiment, the present invention is a process for detecting leakage from a process fluid to a temperature-conditioning fluid in an industrial process wherein the industrial process includes a process fluid and a temperature-conditioning fluid and the temperature-conditioning fluid receives heat from or transfers heat to the process fluid by an indirect contact method, wherein at least one of said A and said B fluids is a gaseous stream, comprising;
  maintaining in the process fluid at least one specie of tracer chemical, which specie of tracer chemical is not a normal component of the temperature-conditioning fluid;
  subjecting at least one of the process fluid and the temperature fluid to at least one analysis at least one site; and
  wherein the analysis at least detects the presence of the specie of tracer chemical when the fluid subjected to the analysis is the temperature-conditioning fluid, and wherein the analysis at least determines the concentration of the specie of tracer chemical when the fluid subjected to the analysis is the process fluid.

The present invention in another embodiment is a process for detecting leakage between a process fluid and a temperature-conditioning fluid in an industrial process wherein the industrial process includes an A and a B fluid, and one of the A and B fluids receives heat from or transfers heat to the other of the A and the B fluids by an indirect contact method, and one but not both of the A and B fluids is an industrial process fluid, comprising;
  maintaining in the A fluid at least one specie of tracer chemical, which specie of tracer chemical is not a normal component of the B fluid;
  subjecting at least one of the A and the B fluids to at least one analysis at least one site; and
  wherein the analysis at least detects the presence of the specie of tracer chemical when the fluid subjected to the analysis is the B fluid, wherein the, analysis at least determines the concentration of the specie of tracer chemical when the fluid subjected to the analysis is the A fluid, and
  wherein at least a detection of the specie of chemical tracer activates or modifies a signal, and the signal upon activation or modification activates or modifies a feed of at least one treatment chemical to the B fluid, wherein the treatment chemical feed upon activation or modification is effective to at least lessen at least one deleterious effect of a leakage of a portion of the A fluid into the B fluid.

The present invention in another embodiment is a process for detecting a leakage site between a process fluid and a temperature-conditioning fluid in an industrial process wherein the industrial process includes an A fluid and a B fluid normally held respectively within an A means of containment and a B means of containment, and one of the A and B fluids normally receives heat from or transfers heat to the other of the A and the B fluids by an indirect contact method, wherein one but not both of said A and said B fluids is an industrial process fluid and one but not both of the A and the B fluids is an industrial process fluid, comprising;
  maintaining in at least one segment of the A containment means at least one specie of tracer chemical; and
  determining the site at which the specie of tracer chemical appears within the B containment means, particularly wherein the appearance of the specie of chemical tracer is determined by fluorescence analysis and/or wherein the segment of the A containment means is a heat-exchanger.

In certain preferred embodiments, the specie of chemical tracer is a normal component of the A fluid or process fluid. In certain preferred embodiments, the specie of chemical tracer is a synthetically tagged normal component of the A fluid or process fluid, for instance such as when a polymeric water treatment agent is tagged with pendant fluorescent groups by post-polymerization derivatization, as discussed above. In certain preferred embodiments, the specie of chemical tracer is foreign to the normal components of the A fluid or process fluid, for instance when an inert tracer is added for the purposes of present invention, or both for the purposes of the present invention and for the purposes of a distinct tracer process. In certain preferred embodiments, the specie of chemical tracer is at least one fluorescent compound and the analysis at least includes fluorescence analysis, which is particularly preferred because of the ease at which such method can be used for on-line continuous or semi-continuous monitoring, and other known advantages.

In certain preferred embodiments, the B fluid is the fluid subjected to the analysis. In certain preferred embodiments, at least one of the A and the B fluids is subjected to a plurality of analysis across a suspected or potential site of leakage so that the location of the site of leakage can be determined. In certain preferred embodiments, the analysis is an on-line continuous or semi-continuous analysis.

In certain preferred embodiments, the analysis is an on-line continuous or semi-continuous analysis of the B fluid, wherein at least a detection of the specie of chemical tracer activates or modifies a signal, and the signal upon activation or modification activates or modifies a feed of at least one treatment chemical to the B fluid, wherein the treatment chemical feed upon activation or modification is effective to at least lessen at least one deleterious effect of a leakage of a portion of the A fluid or process fluid into the B fluid.

In certain preferred embodiments, the analysis is an on-line continuous or semi-continuous fluorescence analysis of the B fluid and the specie of chemical tracer is at least one fluorescent compound. In certain preferred embodiments, the analysis is an on-line continuous fluorescence analysis of the B fluid and the specie of chemical tracer is at least one fluorescent compound, wherein at least a detection of the specie of chemical tracer activates or modifies a signal, and the signal upon activation or modification activates or modifies a feed of at least one treatment chemical to the B fluid, wherein the treatment chemical feed upon activation or modification is effective to at least lessen at least one deleterious effect of a leakage of a portion of the A fluid or process fluid into the B fluid.

In certain preferred embodiments, one of the A and the B fluids is cooling water.

In certain preferred embodiments, the A fluid or process fluid and the B fluid are fluid streams that each flow through a side of each of a plurality of heat-exchangers, and wherein at least one of the A and the B fluids are subjected to a plurality of analysis and at least two of the plurality of the analysis are conducted across at least one of the plurality of heat-exchangers.

In certain preferred embodiments, the analysis determines a spectral or chemical characteristic of the specie of chemical tracer that is proportional to the concentration of the specie of chemical tracer in the fluid analyzed.

In certain preferred embodiments, both of the A fluid or process fluid and the B fluid are aqueous-based fluids.

In certain preferred embodiments, the analysis is one of fluorescence emission spectroscopy, combined high pressure liquid chromatography and fluorescence emission spectroscopy, colorimetry spectrophotometry, ion selective electrode analysis, and transition metal analysis. In certain preferred embodiments, the specie of chemical tracer is substantially resistant to depletion mechanisms in the environment of at least one of the A and the B fluids, such as degradation, deposition, consumption and other like depletion mechanisms. In certain preferred embodiments, the specie of chemical tracer is substantially resistant to depletion mechanisms in the environments of both of the A and the B fluids.

In certain preferred embodiments, the process fluid contains a non-waste raw material or non-waste intermediate or non-waste product of the industrial process, and such process fluids for many industrial processes may be extremely sensitive to contamination, and thus in serious need of an effective and practical method for determination of contamination from a temperature-conditioning fluid.

In certain preferred embodiments, the treatment chemical whose feed is activated or modified by a signal responsive to the detection of a leak is a biocide. The activation or increase of a biocide feed, for instance into the temperature-conditioning fluid, is particularly important for those industrial processes in which a leakage from a process fluid may release an organic nutrient.

The present invention includes a process for detecting leakage between a process fluid and a temperature-conditioning fluid in an industrial process wherein the industrial process includes an A and a B fluid, and one of the A and B fluids receives heat from or transfers heat to the other of the A and the B fluids by an indirect contact method, wherein one but not both of said A and said B fluids is an industrial process fluid and wherein at least one of said A and said B fluids is a gaseous stream, comprising;

maintaining in the A fluid at least one specie of chemical tracer, which specie of chemical tracer is not a normal component of the B fluid;

subjecting at least one of the A and the B fluids to at least one analysis at least one site; and wherein the analysis at least detects the presence of the specie of chemical tracer when the fluid subjected to the analysis is the B fluid, wherein the analysis at least determines the concentration of the specie of chemical tracer when the fluid subjected to the analysis is the A fluid. In preferred embodiment, the B fluid is a normally-gaseous process fluid containing a sufficient amount of water vapor to form a condensate sample upon cooling a fraction of the B fluid and the fluid subjected to the analysis is the B fluid and the analysis at least detects the presence of the specie of chemical tracer in at least one condensate sample of the B fluid. In further preferred embodiment, the specie of chemical tracer is a fluorescent tracer and the analysis determines a fluorescent spectral characteristic of the specie of chemical tracer in the fluid analyzed. In further preferred embodiment, at least one of the process fluid and the temperature-conditioning fluid is subjected to a plurality of the analysis across a suspected or potential site of leakage. In further preferred embodiment, the specie of chemical tracer is at least one fluorescent compound and the analysis at least includes fluorescence and is a continuous, semi-continuous or intermittent analysis. In further preferred embodiment, the process fluid and the temperature-conditioning fluid are fluid streams that each flow through opposite sides of each of a plurality of heat-exchangers, and wherein at least one of the process and the temperature-conditioning fluids is subjected to a plurality the analysis and at least two of the plurality of the analysis are conducted across at least one of the plurality of heat-exchangers.

The present invention also includes a process for detecting leakage between a process fluid and a temperature-conditioning fluid in an industrial process wherein the industrial process includes an A and a B fluid, and one of the A and B fluids receives heat from or transfers heat to the other of the A and the B fluids by an indirect contact method, wherein one but not both of said A and said B fluids is an industrial process fluid and wherein at least one of said A and said B fluids is a gaseous stream, comprising;

maintaining in the A fluid at least one specie of chemical tracer, which specie of chemical tracer is not a normal component of the B fluid;

subjecting at least one of the A and the B fluids to at least one analysis at least one site; and wherein the analysis at least detects the presence of the specie of chemical tracer when the fluid subjected to the analysis is the B fluid, wherein the analysis at least determines the concentration of the specie of chemical tracer when the fluid subjected to the analysis is the A fluid, wherein the specie of chemical tracer is a normal component of the A fluid or a synthetically tagged normal component of the A fluid or is foreign to the normal components of the A fluid, and wherein the specie of chemical tracer is at least one fluorescent compound and the analysis at least includes fluorescence analysis.

In preferred embodiment, the A fluid and the B fluid are fluid streams that each flow through opposite sides of each of a plurality of heat-exchangers, and at least one of the A and the B fluids is subjected to a plurality the analysis and at least two of the plurality of the analysis are conducted across at least one of the plurality of heat-exchangers. In further preferred embodiment, the analysis is of the A fluid and the analysis determines the spectral characteristic of the specie of chemical tracer that is proportional to the concentration of the specie of chemical tracer in the A fluid. In further preferred embodiment, at least a detection of the specie of chemical tracer activates or modifies a signal, and the signal upon activation or modification activates or modifies a feed of at least one treatment chemical to the B fluid, wherein the treatment chemical feed upon activation or modification is effective to at least lessen at least one deleterious effect of a leakage of a portion of the A fluid into the B fluid. In further preferred embodiment, the specie of chemical tracer is added to the A fluid in an amount sufficient to survive in a detectable amount for detectability in the B fluid. In further preferred embodiment, the A fluid is cooling water or boiler water. In further preferred embodiment, the B fluid is a normally-gaseous process fluid containing a sufficient amount of water vapor to form a condensate sample upon cooling a fraction of the B fluid and the fluid subjected to the analysis is the B fluid and the analysis at least detects the presence of the specie of chemical tracer in at least one condensate sample of the B fluid. In further preferred embodiment, the A fluid is the water of a waste-heat boiler.

The present invention includes a process for detecting a leakage site between a process fluid and a temperature-conditioning fluid in an industrial process wherein the industrial process includes an A fluid and a B fluid normally held respectively within an A means of containment and a B means of containment, wherein one but not both of said A and said B fluids is an industrial process fluid and one of the A and B fluids normally receives heat from or transfers heat to the other of the A and the B fluids by an indirect contact method, and wherein at least one of said A and said B fluids is a gaseous stream, comprising;

maintaining in at least one segment of the A containment means at least one specie of chemical tracer; and monitoring the A to determine the concentration of the specie of chemical tracer and monitoring the B fluid to determine at least the presence of the specie of chemical tracer.

In preferred embodiment, the presence of the specie of chemical tracer in the B fluid is determined by fluorescence analysis. In further preferred embodiment, the segment of the A containment means is a heat-exchanger, and the B fluid is a process stream and the A fluid is a temperature-conditioning fluid that receives heat from the B fluid. In further preferred embodiment, the segment of the A containment means is a heat-exchanger and the specie of chemical tracer is maintained in the temperature-conditioning fluid side of the heat-exchanger. In further preferred embodiment, the specie of chemical tracer is at least fluorescent compound. In further preferred embodiment, the heat-exchanger is on-line at the time the presence of the specie of chemical tracer is determined in the B fluid.

Unless expressly indicated otherwise herein, the inclusion of a prefix or suffix in parenthesis designates the word with such prefix or suffix as an alternative. For instance, "specie(s)" means "specie and/or species", "determinations(s)" means "determination and/or determinations", "technique(s)" means "technique and/or techniques", "location(s)" means, "chemical(s)" means "chemical and/or chemicals", "component(s)" means "component and/or components", "tracer(s)" means "tracer and/or tracers", and the like. By "ppm" is meant "parts per million" by weight. By "ppb" is meant "parts per billion" by weight.

Industrial Applicability of the Invention

The present invention is applicable to all industries employing a temperature-conditioning fluid to receive heat from or transmit heat to a process fluid.

We claim:

1. A process for detecting leakage between a process fluid and a temperature-conditioning fluid in an industrial process wherein said industrial process includes an A and a B fluid, wherein one of said A and B fluids receives heat from or transfers heat to the other of said A and said B fluids by an indirect contact method, wherein one but not both of said A and said B fluids is an industrial process fluid, and wherein at least one of said A and said B fluids is a gaseous stream, comprising;

maintaining in said A fluid at least one specie of chemical tracer, which specie of chemical tracer is not a normal component of said B fluid;

subjecting at least one of said A and said B fluids to at least one analysis at least one site; and wherein said analysis at least detects the presence of said specie of chemical tracer when said fluid subjected to said analysis is said B fluid, wherein said analysis at least determines the concentration of said specie of chemical tracer when said fluid subjected to said analysis is said A fluid.

2. The process of claim 1 wherein said B fluid is a normally-gaseous process fluid containing a sufficient amount of water vapor to form a condensate sample upon cooling a fraction of said B fluid and wherein said fluid subjected to said analysis is said B fluid and said analysis at least detects the presence of said specie of chemical tracer in at least one condensate sample of said B fluid.

3. The process of claim 1 wherein said specie of chemical tracer is a fluorescent tracer and said analysis determines a fluorescent spectral characteristic of said specie of chemical tracer in the fluid analyzed.

4. The process of claim 1 wherein at least one of said process fluid and said temperature-conditioning fluid is subjected to a plurality of said analysis across a suspected or potential site of leakage.

5. The process of claim 1 wherein said specie of chemical tracer is at least one fluorescent compound and said analysis at least includes fluorescence and is a continuous, semi-continuous or intermittent analysis.

6. The process of claim 1 wherein said process fluid and said temperature-conditioning fluid are fluid streams that each flow through opposite sides of each of a plurality of heat-exchangers, and wherein at least one of said process and said temperature-conditioning fluids is subjected to a plurality of analysis and at least two of said plurality of said analysis are conducted across at least one of said plurality of heat-exchangers.

7. A process for detecting leakage between a process fluid and a temperature-conditioning fluid in an industrial process wherein said industrial process includes an A and a B fluid, and one of said A and B fluids receives heat from or transfers heat to the other of said A and said B fluids by an indirect contact method, wherein one but not both of said A and said B fluids is an industrial process fluid, and wherein at least one of said A and said B fluids is a gaseous stream, comprising;
maintaining in said A fluid at least one specie of chemical tracer, which specie of chemical tracer is not a normal component of said B fluid;
subjecting at least one of said A and said B fluids to at least one analysis at least one site; and
wherein said analysis at least detects the presence of said specie of chemical tracer when said fluid subjected to analysis is said B fluid, wherein said analysis at least determines the concentration of said specie of chemical tracer when said fluid subjected to analysis is said A fluid,
wherein said specie of chemical tracer is a normal component of said A fluid or a synthetically tagged normal component of said A fluid or is foreign to the normal components of said A fluid, and
wherein said specie of chemical tracer is at least one fluorescent compound and said analysis at least includes fluorescence analysis.

8. The process of claim 7 wherein said A fluid and said B fluid are fluid streams that each flow through a side of each of a plurality of heat-exchangers, and wherein at least one of said A and said B fluids is subjected to a plurality said analysis and at least two of said plurality of said analysis are conducted across at least one of said plurality of heat-exchangers.

9. The process of claim 7 wherein said analysis is of said A fluid and said analysis determines said spectral characteristic of said specie of chemical tracer that is proportional to the concentration of said specie of chemical tracer in said A fluid.

10. The process of claim 7 wherein at least a detection of said specie of chemical tracer activates or modifies a signal, and said signal upon activation or modification activates or modifies a feed of at least one treatment chemical to said 5B fluid, wherein said treatment chemical feed upon activation or modification is effective to at least lessen at least one deleterious effect of a leakage of a portion of said A fluid into said B fluid.

11. The process of claim 7 wherein said specie of chemical tracer is added to said A fluid in an amount sufficient to survive in a detectable amount for detectability in said B fluid.

12. The process of claim 11 wherein said A fluid is cooling water or boiler water.

13. The process of claim 12 wherein said B fluid is a normally-gaseous process fluid containing a sufficient amount of water vapor to form a condensate sample upon cooling a fraction of said B fluid and
wherein said fluid subjected to said analysis is said B fluid and said analysis at least detects the presence of said specie of chemical tracer in at least one condensate sample of said B fluid.

14. The process of claim 13 wherein said A fluid is the water of a waste-heat boiler.

15. A process for detecting a leakage site between a process fluid and a temperature-conditioning fluid in an industrial process wherein said industrial process includes an A fluid and a B fluid normally held respectively within an A means of containment and a B means of containment, and one of said A and B fluids normally receives heat from or transfers heat to the other of said A and said B fluids by an indirect contact method, wherein one but not both of said A and said B fluids is an industrial process fluid, and wherein at least one of said A and said B fluids is a gaseous stream, comprising:
maintaining in at least one segment of said A fluid in the A containment means at least one specie of chemical tracer; and,
monitoring said A fluid to determine the concentration of said specie of chemical tracer and monitoring said B fluid to determine at least the presence of said specie of chemical tracer whereby the presence of said specie of chemical tracer in the B fluid indicates a leakage of A fluid into the B fluid.

16. The process of claim 15 wherein said presence of said specie of chemical tracer in said B fluid is determined by fluorescence analysis.

17. The process of claim 15 wherein said segment of said A containment means is a heat-exchanger, and
wherein said B fluid is a process stream and said A fluid is a temperature-conditioning fluid that receives heat from said B fluid.

18. The process of claim 15 wherein said segment of said A containment means is a heat-exchanger and said specie of chemical tracer is maintained in the temperature-conditioning fluid side of said heat-exchanger.

19. The process of claim 18 wherein said specie of chemical tracer is at least fluorescent compound.

20. The process of claim 18 wherein said heat-exchanger is on-line at the time said presence of said specie of chemical tracer is determined in said B fluid.

* * * * *

UNITED STATES PATENT AND TRADEMARK OFFICE
CERTIFICATE OF CORRECTION

PATENT NO. : 5,416,323
DATED : MAY 16, 1995
INVENTOR(S) : JOHN E. HOOTS, ET AL

It is certified that error appears in the above-indentified patent and that said Letters Patent is hereby corrected as shown below:

CLAIM 10, COLUMN 22, LINE 5

" chemical to said 5B fluid, wherein said treatment chemi- "

SHOULD READ AS:

-- chemical to said B fluid, wherein said treatment chemi- --.

Signed and Sealed this

Eighth Day of August, 1995

Attest:

BRUCE LEHMAN

Attesting Officer

Commissioner of Patents and Trademarks